(12) United States Patent
Uchida

(10) Patent No.: US 6,388,432 B2
(45) Date of Patent: May 14, 2002

(54) CPU CORE VOLTAGE SWITCHING CIRCUIT

(75) Inventor: Masanobu Uchida, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/736,563

(22) Filed: Dec. 13, 2000

(30) Foreign Application Priority Data

Dec. 15, 1999 (JP) .......................................... 11-355264

(51) Int. Cl.⁷ ................................................ G05F 1/40
(52) U.S. Cl. ...................................................... 323/266
(58) Field of Search ................................ 323/266, 268, 323/270, 273, 275, 282, 283, 285; 363/49

(56) References Cited

U.S. PATENT DOCUMENTS

| | | | |
|---|---|---|---|
| 4,017,787 A | * 4/1977 | Hara et al. | ................. 321/45 S |
| 4,686,616 A | * 8/1987 | Williamson | ................... 363/21 |
| 6,085,277 A | * 7/2000 | Nordstrom et al. | ......... 710/263 |
| 6,151,541 A | * 11/2000 | Iizuka | ......................... 701/51 |

FOREIGN PATENT DOCUMENTS

| | | |
|---|---|---|
| JP | 54-148430 | 11/1979 |
| JP | 05-108193 | 4/1993 |
| JP | 07-081186 | 3/1995 |
| JP | 08-87364 | 4/1996 |

* cited by examiner

Primary Examiner—Matthew Nguyen
(74) Attorney, Agent, or Firm—Scully, Scott, Murphy & Presser

(57) ABSTRACT

A CPU core voltage switching circuit installed in a personal digital assistant wherein, when the personal digital assistant is using an application software product, a CPU clock frequency is reduced to a half of the frequency used when the personal digital assistant is in an initial start state or a memory data initialization state.

17 Claims, 3 Drawing Sheets

4...BATTERY
107...OUTPUT SIGNAL

4... BATTERY
107... OUTPUT SIGNAL 1-2...REGULATOR
2-1...HYBRID IC
3...CHANGE OVER SWITCH
100...OUTPUT SIGNAL

CPU CORE VOLTAGE SWITCHING CIRCUIT

FIELD OF THE INVENTION

The present invention relates to a CPU (Central Processing Unit) core voltage switching circuit for reducing the power consumption of a CPU.

BACKGROUND OF THE INVENTION

Conventionally, a CPU core voltage switching circuit, to which the present invention pertains, has been used primarily in reducing the power consumption of the CPU. With respect to such a CPU core voltage switching circuit, used recently in personal digital assistants (PDA), there is need to reduce power consumption in a terminal.

SUMMARY OF THE DISCLOSURE

Conventionally, the CPU core voltage switching circuit used in a personal digital terminal (or assistant) requires a constant CPU core voltage.

However, there are problems encountered in the course of investigations toward the present invention. That is, the problems with the prior art reside in that, because the CPU core voltage (or the switching circuit thereof) requires a constant voltage, it is impossible to reduce power even when a slow CPU CLK (CPU clock pulse) is used or the load is reduced.

In view of the foregoing, it is an object of according to an aspect of the present invention to provide a low power-consumption CPU core voltage switching circuit.

It is another object according to another aspect of the present invention to provide a novel improved personal digital terminal or assistant. According to the present invention the CPU core voltage switching circuit is configured as described below.

According to a first aspect of the present invention, there is provided a CPU core voltage switching circuit installed in a personal digital assistant wherein, when the personal digital assistant is using (or performing) an application software product, CPU clock frequency is reduced to a half of a frequency used when the personal digital assistant is in an initial start state or a memory data initialization state.

According to a second aspect of the present invention, there is provided a CPU core voltage switching circuit wherein the CPU clock frequency used when the personal digital assistant is using an application software product is reduced to the half of a frequency used when the personal digital assistant is in the initial start state or in the memory data initialization state to make a CPU core voltage used when the personal digital assistant is using the application software product lower than a voltage used when the personal digital assistant is in the initial start state or in the memory data initialization state.

According to a third respect of the present invention, there is provided a CPU core voltage switching circuit wherein the CPU clock frequency is 33 MHz when the personal digital assistant is in the initial start state or in the memory data initialization state, and wherein the CPU clock frequency is 16.5 MHz when the personal digital assistant is using the application software product.

According to a fourth aspect of the present invention, there is provided a CPU core voltage switching circuit wherein the CPU clock frequency is set to 33 MHz to set the CPU core voltage to a first voltage (e.g., 2.7 V) when the personal digital assistant is in the initial start state or in the memory data initialization state, and wherein the CPU clock frequency is set to 16.5 MHz to set the CPU core voltage to a second voltage (e.g., 2.0 V) which is lower than the first voltage when the personal digital assistant is using the application software product.

According to a fifth aspect of the present invention, there is provided a CPU core voltage switching circuit, comprising a gate module outputting an input voltage as a CPU core voltage in response to a voltage control signal representing a high voltage; a voltage decreasing module decreasing an input voltage in response to a voltage control signal representing a low voltage and outputting the input voltage as the CPU core voltage; and a voltage switching control module increasing the CPU clock frequency and outputting a voltage control signal representing the high voltage to the gate module if the control signal indicates that the personal digital assistant is in the initial start state or in the memory data initialization state and for decreasing the CPU clock frequency and outputting a voltage control signal representing the low voltage to the voltage decreasing module if the control signal indicates that the personal digital assistant is using the application software product, the voltage control signal being responsive to the control signal input to the personal digital assistant from an external unit.

According to a sixth aspect of the present invention, there is provided a CPU core voltage switching circuit, wherein a gate module is a field effect transistor which receives an input voltage at a source terminal (S), receives a voltage control signal representing a high voltage at a gate terminal (G), and outputs the CPU core voltage at a drain terminal (D).

According to a seventh aspect of the present invention, there is provided a CPU core voltage switching circuit as defined by claim 5 wherein the voltage decreasing means is a regulator which receives the input voltage at an input terminal, receives the voltage control signal representing the low voltage at a control terminal, and outputs an output terminal voltage as the CPU core voltage at a drain terminal.

According to an eighth aspect of the present invention, there is provided a CPU core voltage switching circuit, wherein a voltage switching control module comprises a hybrid IC (Integrated Circuit) which increases the CPU clock frequency if the control signal indicates that the personal digital assistant is in the initial start state or in the memory data initialization state and decreases the CPU clock frequency if the control signal indicates that the personal digital assistant is using the application software product; and an RS flip-flop and an OR circuit which, in response to the CPU clock frequency, output a voltage control signal representing a high voltage to a gate module if the CPU clock frequency is high, and outputs a voltage control signal representing a low voltage to the gate module if the CPU clock frequency is low.

According to a ninth aspect of the present invention, there is provided a CPU core voltage switching circuit, wherein a hybrid IC comprises a CPU and a system controller.

According to a tenth aspect of the present invention, there is provided a CPU core voltage switching circuit, wherein a hybrid IC sets the CPU clock frequency to a high frequency (e.g., 33 MHz) if the control signal indicates that the personal digital assistant is in the initial start state or in the memory data initialization state and sets the CPU clock frequency to a half of said high frequency (e.g., 16.5 MHz) if the control signal indicates that the personal digital assistant is using the application software product.

According to an eleventh aspect of the present invention, there is provided a CPU core voltage switching circuit, wherein a gate module outputs a high input voltage as a CPU core voltage (e.g., of 2.7 V) in response to the voltage control signal representing the high voltage.

According to a twelfth aspect of the present invention, there is provided a CPU core voltage switching circuit, wherein a voltage decreasing module decreases the input voltage in response to the voltage control signal representing a low voltage and outputs low input voltage as the CPU core voltage (e.g. of 2.0 V).

According to a thirteenth aspect of the present invention, there is provided a personal digital assistant comprising the CPU core voltage switching circuit according to the first aspect.

According to a fourteenth aspect of the present invention, there is provided a personal digital assistant comprising the CPU core voltage switching circuit according to the fifth aspect, or any of other aspects relating to the voltage switching circuit.

PREFERRED EMBODIMENTS OF THE INVENTION

A CPU core voltage switching circuit according to the present invention drives an apparatus or terminal (such as a personal data assistant), in which a circuit according to the present invention is installed, at a first (high) CPU core voltage of 2.7 V when the apparatus or memory data is initialized, and at a second (low) CPU core voltage of 2.0 V when an application software product is used. More specifically, the circuit according to the present invention uses a first (high) frequency of f=33 MHz as a CPU CLK frequency to set the CPU core voltage to 2.7 V when an apparatus containing this circuit is initialized or memory data is initialized, a second (low) of frequency and f/2=16.5 MHz as a CPU CLK frequency to set the CPU core voltage to 2.0 V when an application software product is executed.

In a voltage switching control circuit 2, which will be decried later, a voltage switch trigger signal (control signal that will be described later; SUSPEND signal) is controlled in advance by a control signal entered from an external switch, not shown in the figure, so that the state of that signal changes during a transitional period from the moment the apparatus is started or memory data is initialized to a moment an application screen is displayed. That is, immediately before start up of the application screen, the screen is once turned off and then turned on (this is equivalent to the mode in which power is turned off and then turned on via key operation), voltage switching is mechanically controlled by the external key described above.

An embodiment of the present invention will be described in more detail with reference to the attached drawings.

Figure 1:
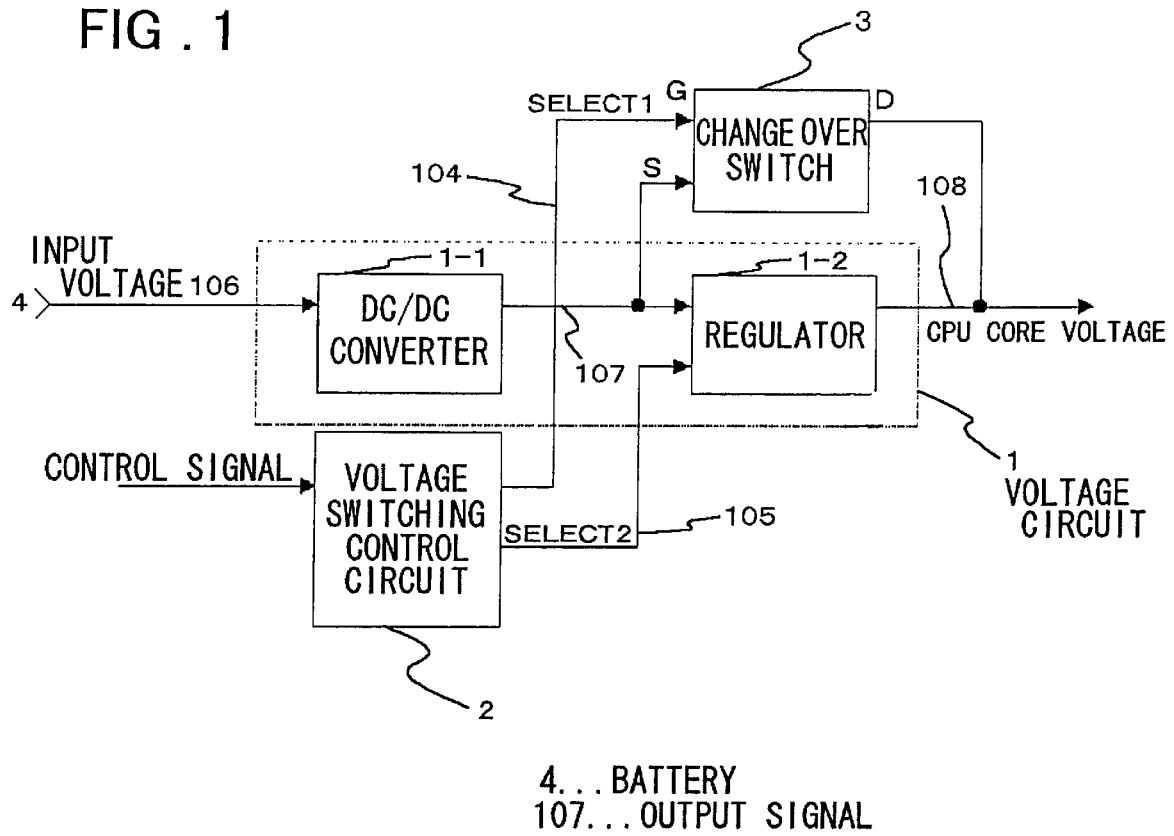
FIG. 1 is a block diagram of an electric circuit representing an embodiment of the present invention.

FIG. 1 is a block diagram showing the embodiment of the present invention. The embodiment comprises a voltage circuit 1, a voltage switching control circuit 2, and a change over switch 3 (Field Effect Transistor (FET) in this embodiment).

Figure 2:
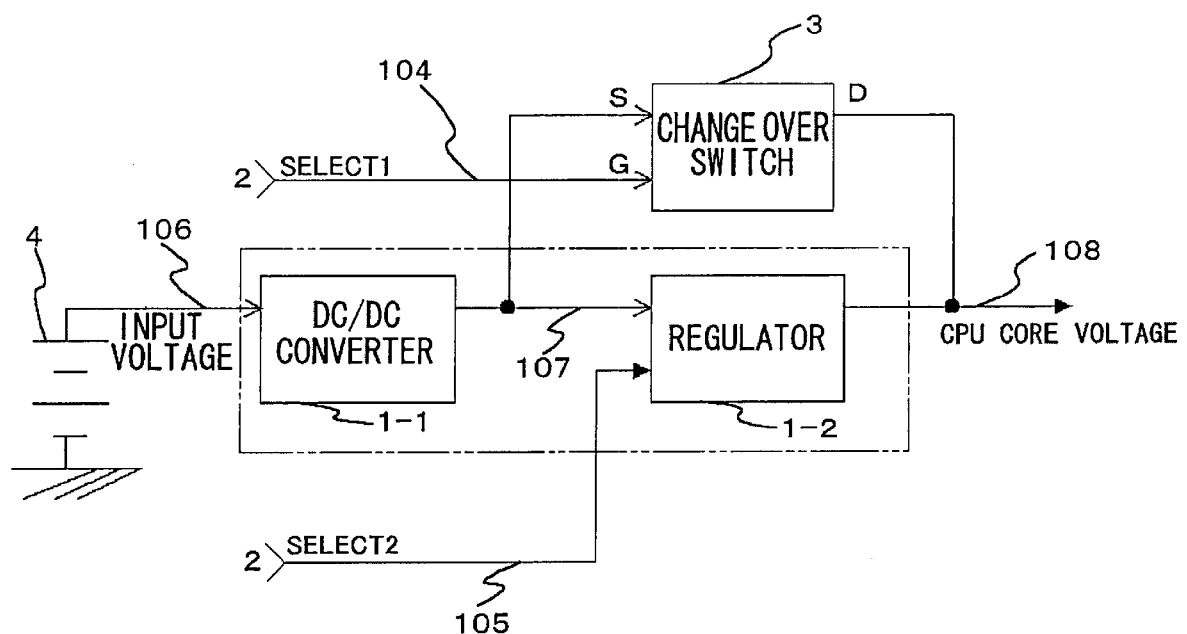
FIG. 2 is an electric circuit diagram showing the voltage circuit 1 and the alteration switch 3 shown in FIG. 1.
Figure 3:
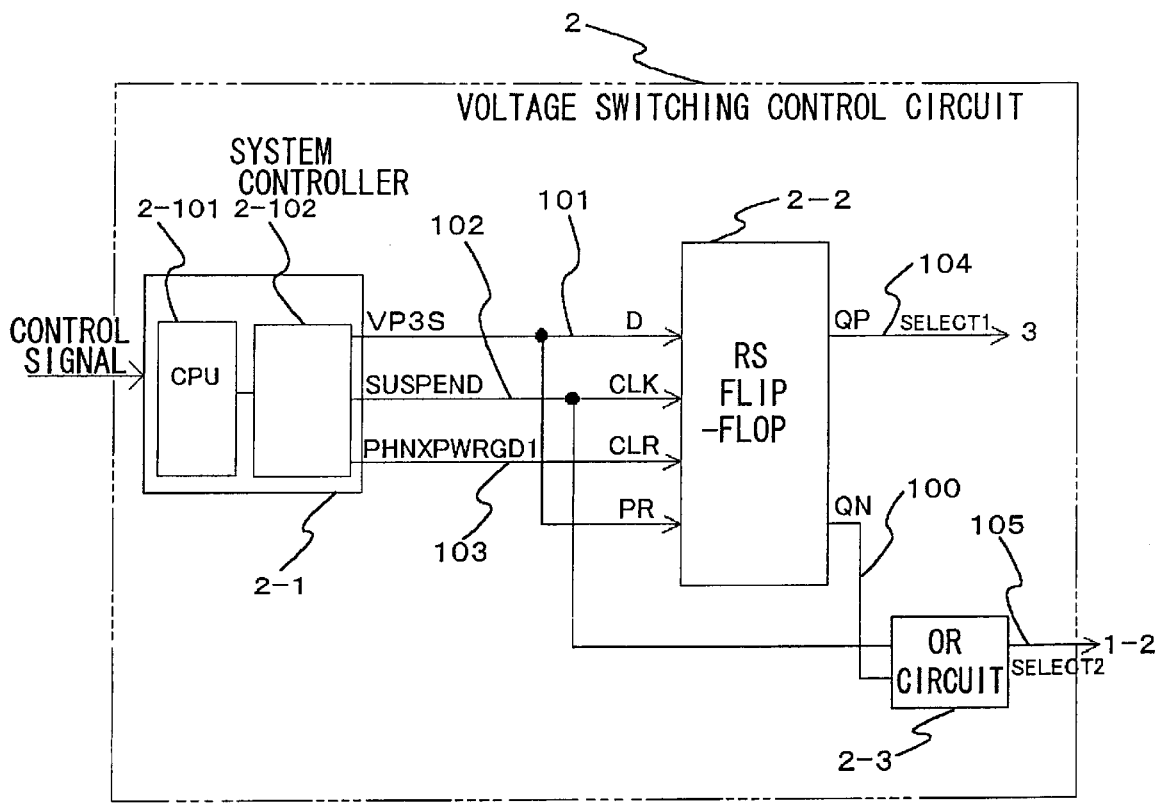
FIG. 3 is an electric circuit diagram showing the internal circuit of the voltage switching control circuit 2 shown in FIG. 1.

As shown in FIGS. 1 and 2, the voltage circuit 1 comprises a DC/DC converter 1—1 and a regulator 1–2. As shown in FIG. 3, the voltage switching control circuit 2 comprises a hybrid IC 2–1 composed of a CPU 2–101 and a system controller 2–102, an RS flip-flop 2—2, and an OR circuit 2–3.

The operation of the voltage circuit 1 and the change over switch 3 will be described by referring to FIGS. 2 and 3. When the input voltage (voltage of a battery 4) is applied to the (Step down) DC/DC converter 1—1 at the initial start of the apparatus (CPU CLK at f=33 MHz), an output signal 107 (2.7 V) is output. At this time, the regulator 1–2 is in the output stop (off) state and the change over switch 3 is on. Therefore, the output signal 107 is output directly as a CPU core voltage 108.

Next, when the apparatus proceeds from the initial start state to the application screen display state, the state of a SUSPEND signal 102 changes in response to a control signal from an external switch not shown in the figure. With the SUSPEND signal as a trigger, the states of a SELECT1 signal 104 and an output signal 100, which are output from the RS flip-flop 22 (FIG. 3) of the voltage switching control circuit 2, change. At this time, because the change over switch 3 is off and the regulator 1–2 is in the output state (ON), the output voltage of the regulator 1–2 is output directly as the CPU core voltage 108.

The operation of the voltage switching control circuit 2 will be described by referring to FIG. 3. The voltage switching control circuit 2 comprises a hybrid IC (MCM: Phoenix-HB) 2–1 composed of the CPU 2–101 and the system controller 2–102 and the RS flip-flop (HC74) 2—2. The RS flip-flop 2—2 receives a VP3S signal 101, the SUSPEND signal 102 that is output from the hybrid IC 2–1, and a PHNXPWRGD1 signal (reset signal) 103.

The RS flip-flop 2—2 generates its output signals, SELECT1 signal 104 and SELECT2 signal 105, on a rising edge of the SUSPEND signal 102.

The CPU core voltage switching signal in this embodiment, with the configuration described above, may reduce power consumption.

The present invention is not limited to the embodiment described above but may be applied to any preferable applications.

The number, positions, and shapes of components are not limited to those of the embodiment described above but may be changed according to an application to which the present invention is applied.

In the drawings, the same reference numerals denote the same structural elements.

The meritorious effects of the present invention are summarized as follows.

The present invention provides a low power-consumption CPU core voltage switching circuit configured as described above.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A Central Processing Unit, termed hereafter as "CPU", core voltage switching circuit installed in a personal digital assistant wherein, when the personal digital assistant is using an application software product, a CPU clock frequency is reduced to a half of a frequency used when the personal digital assistant is in an initial start state or a memory data initialization state.

2. The CPU core voltage switching circuit as defined by claim 1 wherein the CPU clock frequency used when the personal digital assistant is using the application software product is reduced to the half of the frequency used when the personal digital assistant is in the initial start state or in the memory data initialization state to set a CPU core voltage used when the personal digital assistant is using the application software product to a lower voltage than a voltage used when the personal digital assistant is in the initial start state or in the memory data initialization state.

3. The CPU core voltage switching circuit as defined by claim 1 wherein the CPU clock frequency is 33 MHz when the personal digital assistant is in the initial start state or in the memory data initialization state and wherein the CPU clock frequency is 16.5 MHz when the personal digital assistant is using the application software product.

4. The CPU core voltage switching circuit as defined by claim 1 wherein the CPU clock frequency is set to 33 MHz to set the CPU core voltage to 2.7 V when the personal digital assistant is in the initial start state or in the memory data initialization state, and wherein the CPU clock frequency is set to 16.5 MHz to set the CPU core voltage to 2.0 V when the personal digital assistant is using the application software product.

5. The CPU core voltage switching circuit as defined by claim 1, comprising:

a gate circuit outputting an input voltage as the CPU core voltage in response to a voltage control signal representing a high voltage;

a voltage decreasing circuit decreasing the input voltage in response to the voltage control signal representing a low voltage and outputting the input voltage as the CPU core voltage; and a voltage switching control circuit increasing the CPU clock frequency and outputting the voltage control signal representing the high voltage to said gate circuit if the control signal indicates that said personal digital assistant is in the initial start state or in the memory data initialization state, said voltage switching control circuit decreasing the CPU clock frequency and outputting the voltage control signal representing the low voltage to said voltage decreasing circuit if the control signal indicates that said personal digital assistant is using the application software product, the voltage control signal being responsive to the control signal input to said personal digital assistant from an external unit.

6. The CPU core voltage switching circuit as defined by claim 5 wherein said gate circuit is a field effect transistor which receives the input voltage at a source terminal (S), receives the voltage control signal representing the high voltage at a gate terminal (G), and outputs the CPU core voltage at a drain terminal (D).

7. The CPU core voltage switching circuit as defined by claim 5 wherein said voltage decreasing circuit is a regulator which receives the input voltage at an input terminal, receives the voltage control signal representing the low voltage at a control terminal, and outputs an output terminal voltage as the CPU core voltage at a drain terminal.

8. The CPU core voltage switching circuit as defined by claim 5 wherein said voltage switching control circuit comprises:

a hybrid Integrated Circuit, termed "IC" herein, which increases the CPU clock frequency if the control signal indicates that said personal digital assistant is in the initial start state or in the memory data initialization state, and decreases the CPU clock frequency if the control signal indicates that said personal digital assistant is using the application software product; and an Reset-Set, termed as "RS" herein, flip-flop and an OR circuit which, in response to the CPU clock frequency, output a voltage control signal representing the high voltage to the gate circuit if the CPU clock frequency is high, and outputs a voltage control signal representing the low voltage to the gate circuit if the CPU clock frequency is low.

9. The CPU core voltage switching circuit as defined by claim 5 wherein said hybrid IC comprises a CPU and a system controller.

10. The CPU core voltage switching circuit as defined by claim 5 wherein said hybrid IC sets the CPU clock frequency to 33 MHz if the control signal indicates that said personal digital assistant is in the initial start state or in the memory data initialization state, and sets the CPU clock frequency to 16.5 MHz if the control signal indicates that said personal digital assistant is using the application software product.

11. The CPU core voltage switching circuit as defined by claim 10 wherein the gate circuit outputs an input voltage as the CPU core voltage of 2.7 V in response to the voltage control signal representing the high voltage.

12. The CPU core voltage switching circuit as defined by claim 10 wherein the voltage decreasing circuit decreases the input voltage in response to the voltage control signal representing the low voltage, and outputs an input voltage of 2.0 V as the CPU core voltage.

13. A personal digital assistant comprising the CPU core voltage switching circuit as defined by claim 1.

14. A personal digital assistant comprising the CPU core voltage switching circuit as defined by claim 5.

15. A personal digital assistant comprising a CPU core voltage switching circuit, said CPU core voltage switching circuit outputting a first CPU clock frequency when the personal digital assistant is in an initial start state or a memory data initialization state and a second lower CPU clock frequency as compared to the first frequency when the personal digital assistant is using an application software product.

16. The personal digital assistant as defined by claim 15 wherein the second lower CPU clock frequency is reduced to a half of the first frequency.

17. The personal digital assistant as defined by claim 15 wherein upon lowering the second frequency, said CPU core voltage switching circuit sets a CPU core voltage to a lower voltage as compared to a first CPU core voltage used when the first CPU clock frequency is output.

* * * * *